(12) United States Patent
Becker et al.

(10) Patent No.: US 9,147,937 B2
(45) Date of Patent: Sep. 29, 2015

(54) MULTIPLE-ANTENNA SYSTEM

(71) Applicant: Harman Becker Automotive Systems GmbH, Karlsbad (DE)

(72) Inventors: Karl-Anton Becker, Karlsbad (DE); Achim Ratzel, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 245 days.

(21) Appl. No.: 13/950,802

(22) Filed: Jul. 25, 2013

(65) Prior Publication Data

US 2014/0028527 A1    Jan. 30, 2014

(30) Foreign Application Priority Data

Jul. 27, 2012   (EP) ..................................... 12178319

(51) Int. Cl.
*G01R 29/08* (2006.01)
*H01Q 5/00* (2015.01)
*H04B 1/00* (2006.01)
*H04B 1/04* (2006.01)
*H04B 17/17* (2015.01)

(52) U.S. Cl.
CPC ........... *H01Q 5/0093* (2013.01); *H04B 1/0064* (2013.01); *H04B 1/0466* (2013.01); *H04B 17/17* (2015.01)

(58) Field of Classification Search
CPC .. H01Q 5/0093; H04B 1/0064; H04B 1/0466; H04B 1/17
See application file for complete search history.

(56) References Cited

U.S. PATENT DOCUMENTS

| | | | |
|---|---|---|---|
| 5,649,308 A | 7/1997 | Andrews | |
| 6,437,577 B1 * | 8/2002 | Fritzmann et al. | 324/523 |
| 6,928,281 B2 * | 8/2005 | Ward et al. | 455/423 |
| 7,224,170 B2 * | 5/2007 | Graham et al. | 324/522 |
| 7,277,056 B1 | 10/2007 | Thiam et al. | |
| 7,386,284 B2 * | 6/2008 | Thompson | 455/115.3 |

(Continued)

FOREIGN PATENT DOCUMENTS

DE   4130608 C1   8/1992
WO   2011026522 A1   3/2011

OTHER PUBLICATIONS

European Search Report for Application No. 12178319.5, mailed Jan. 17, 2013, 3 pages.

(Continued)

*Primary Examiner* — Trinh Dinh
(74) *Attorney, Agent, or Firm* — Brooks Kushman P.C.

(57) ABSTRACT

An antenna system is disclosed herein which includes a frontend portion, a backend portion and a feed line which connects frontend portion and backend portion with each other. The frontend portion comprises at least two antennas, a combiner connected downstream of the antennas and upstream of the feed line and antenna connectors that electrically connect through antenna plugs, the antennas to the combiner. The backend portion includes an electrical power source connected to the feed line and a resistance evaluation circuit connected between the electrical power source and the feed line and that measures the resistance of the frontend portion through the feed line. At least one of the antenna connectors is in mechanical contact with a jumper having jumper plugs between which a high resistance connection and a low resistance connection is provided that depends on whether the corresponding antenna is connected to the combiner or not.

20 Claims, 4 Drawing Sheets

(56) References Cited

U.S. PATENT DOCUMENTS

| | | | |
|---|---|---|---|
| 7,652,635 B2 * | 1/2010 | Finn et al. | 343/850 |
| 8,837,647 B2 * | 9/2014 | Gerlach et al. | 375/345 |
| 2004/0116084 A1 | 6/2004 | Ward et al. | |
| 2006/0116097 A1 | 6/2006 | Thompson | |
| 2006/0145884 A1 | 7/2006 | Graham et al. | |
| 2006/0205369 A1 | 9/2006 | Schaich et al. | |
| 2007/0152675 A1 | 7/2007 | Thole et al. | |
| 2010/0074370 A1 | 3/2010 | Gerlach et al. | |

OTHER PUBLICATIONS

European Search Report for Application No. 12165712.6, mailed Oct. 4, 2012, 7 pages.

European Search Report for Application No. 12165711.8, mailed Oct. 4, 2012, 7 pages.

* cited by examiner

MULTIPLE-ANTENNA SYSTEM

CROSS-REFERENCE TO RELATED APPLICATIONS

This application claims priority to EP Application No. 12 178 319.5-2411 filed Jul. 27, 2012, the disclosure of which is incorporated in its entirety by reference herein.

TECHNICAL FIELD

Disclosed herein is a radio frequency antenna system, specifically a multiple-antenna system which is capable of operating in multiple frequency ranges.

BACKGROUND

An antenna is usually connected to a transmitter or receiver by way of a feed line. Antennas for use at radio frequencies are effective over a limited frequency range. When operation is required over a wide frequency range it is common to use multiple antennas with each antenna being optimized for a specific narrow band of frequencies. The desired antenna is manually selected with a switch or other means that connects that antenna's feed line to the transmitter or receiver.

If the antenna is a so-called active antenna (i.e., includes an antenna (pre-) amplifier), then the antenna amplifiers can easily be supplied with power. Furthermore, an antenna diagnosis can be simply performed for each individual antenna. However, for each antenna in an antenna system, an individual feed line must be provided. This condition makes the system costly, space consuming and heavy and, therefore, less suitable for automotive applications.

Also common are systems in which multiple (active) antennas are connected to multiple receivers and/or transmitters via a single feed line. When using a single feed line, however, antenna diagnosis is difficult to realize, if it can be realized at all. Thus, there is a need to provide a multi-band, multi-antenna system that overcomes the above-mentioned drawbacks.

SUMMARY

An antenna system is disclosed herein which includes a frontend portion, a backend portion and a feed line which connects frontend portion and backend portion with each other. The frontend portion includes at least two antennas, a combiner connected downstream of the antennas and upstream of the feed line and antenna connectors that electrically connect through antenna plugs, the antennas to the combiner. The backend portion includes an electrical power source connected to the feed line and a resistance evaluation circuit that is connected between the electrical power source and the feed line and that measures the resistance of the frontend portion through the feed line. At least one of the antenna connectors is in mechanical contact with a jumper having jumper plugs between which a high resistance connection and a low resistance connection is provided that depends on whether the corresponding antenna is connected to the combiner or not. The jumper plugs are connected to the feed line such that the total resistance of the frontend portion depends on whether the corresponding antenna is connected to the combiner or not. The resistance evaluation circuit is configured to detect whether the antenna is not connected to an antenna amplifier by evaluating the resistance of the frontend portion.

BRIEF DESCRIPTION OF THE DRAWINGS

Various specific examples are described in more detail below based on the exemplary systems shown in the figures of the drawing. Unless stated otherwise, similar or identical components are labeled in all of the figures with the same reference numbers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
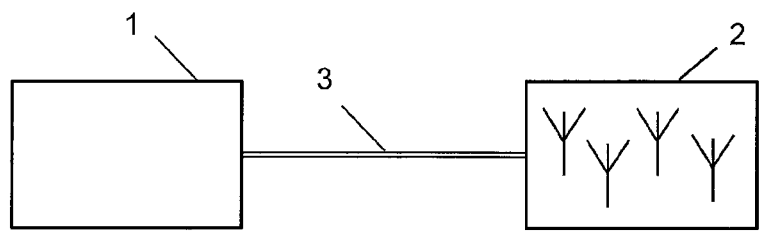
FIG. 1 is a block diagram illustrating an improved multi-band, multi-antenna system that includes a frontend portion and a backend portion.

In FIG. 1, an exemplary improved multi-band, multi-antenna system is shown that includes a backend portion 1 and a frontend portion 2 that are connected via a feed line 3 (e.g., a co-axial cable).

Figure 2:
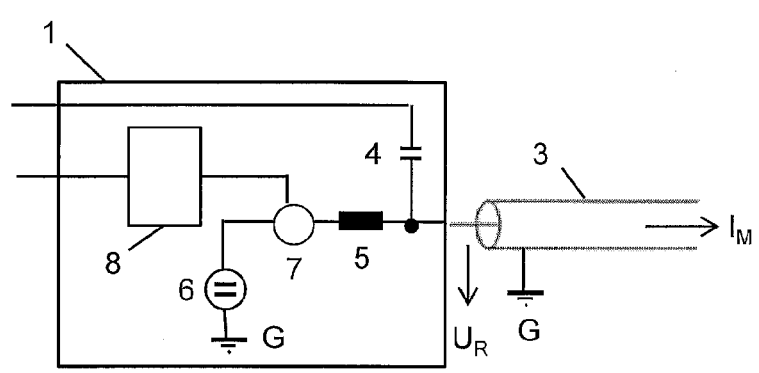
FIG. 2 is a block diagram illustrating an exemplary backend portion applicable in the system of FIG. 1.

An exemplary backend portion 1 is shown in FIG. 2. The backend portion 1 includes a splitter network which may have a capacitor 4 and an inductor 5. By way of the capacitor 4 the useful antenna signals are separated from a DC voltage or current provided to the frontend portion 2 by the backend portion 1 via the inductor 5. In the present example, a constant reference voltage $U_R$ is provided by a reference voltage source 6 and a current measuring circuit 7 measures the DC current $I_M$ drawn from the reference voltage source 6 by the frontend portion 2. The measured DC current $I_M$ is evaluated by a current evaluation circuit 8 that determines one of various states of the frontend portion 2 when it is in a test mode. Each one of the states corresponds to a certain internal resistance $R_i$ of the frontend portion 2 that appears on the feed line 3. The constant reference voltage $U_R$ drives the current $I_M$ through the resistance $R_i$. Thus, the resistance $R_i$ can be calculated from the constant reference voltage $U_R$ and the current $I_M$ ($R_i = U_R/I_M$).

Figure 3:
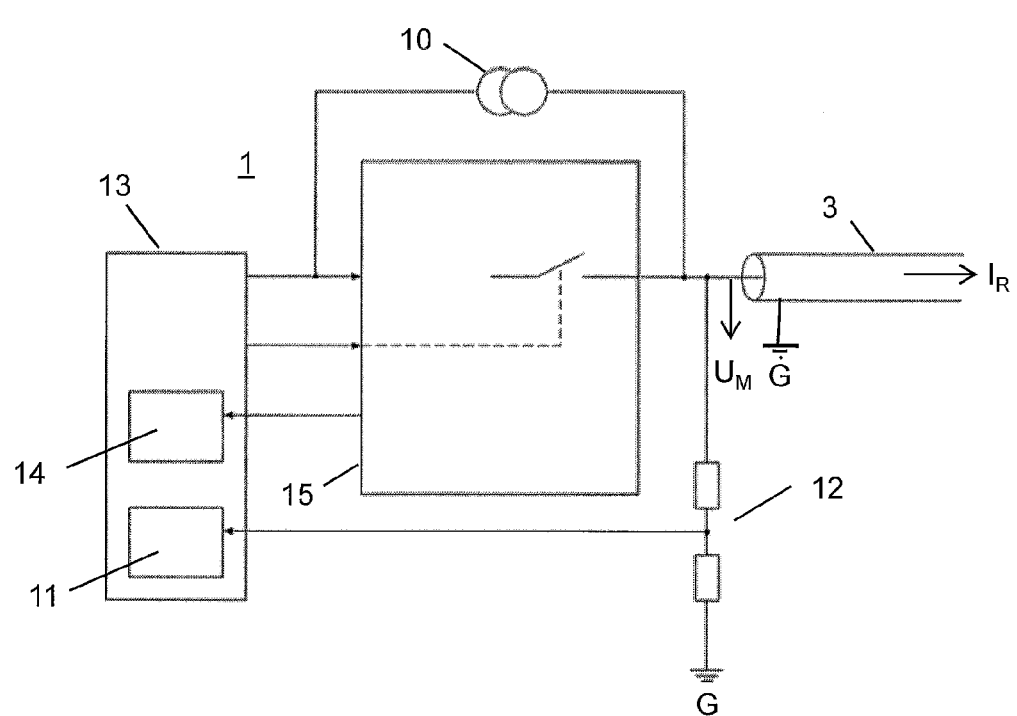
FIG. 3 is a block diagram illustrating another exemplary backend portion applicable in the system of FIG. 1.

FIG. 3 shows another exemplary backend portion 1 in which a reference current source 10 is utilized to measure the instant internal resistance $R_i$ of the frontend portion 2. The reference current source 10 generates a constant current $I_R$ which is supplied to the frontend portion 2. Its internal resistance $R_i$ converts the current $I_R$ into a voltage $U_M$ that is measured by a voltage measurement and evaluation circuit 11 as the voltage passes through a voltage divider 12. The voltage measurement and evaluation circuit 11 is part of a control circuit 13 that also includes a current measurement and evaluation circuit 14 for measuring the current through the frontend portion 2 when the frontend portion is supplied with a supply voltage $U_s$. A controllable switch 15, which may be controlled by the control circuit 13, switches between a test mode in which the constant current $I_R$ is supplied and an operating mode in which the supply voltage $U_s$ is supplied to the frontend portion 2. In the test mode, the current source 10 and the voltage measurement and evaluation circuit 11 are active. In the operating mode the current measurement and evaluation circuit 14 is active and the supply voltage $U_s$ is applied to the feed line 3. A splitter network and an antenna signal path are not shown in FIG. 3 for the sake of simplicity.

Figure 4:
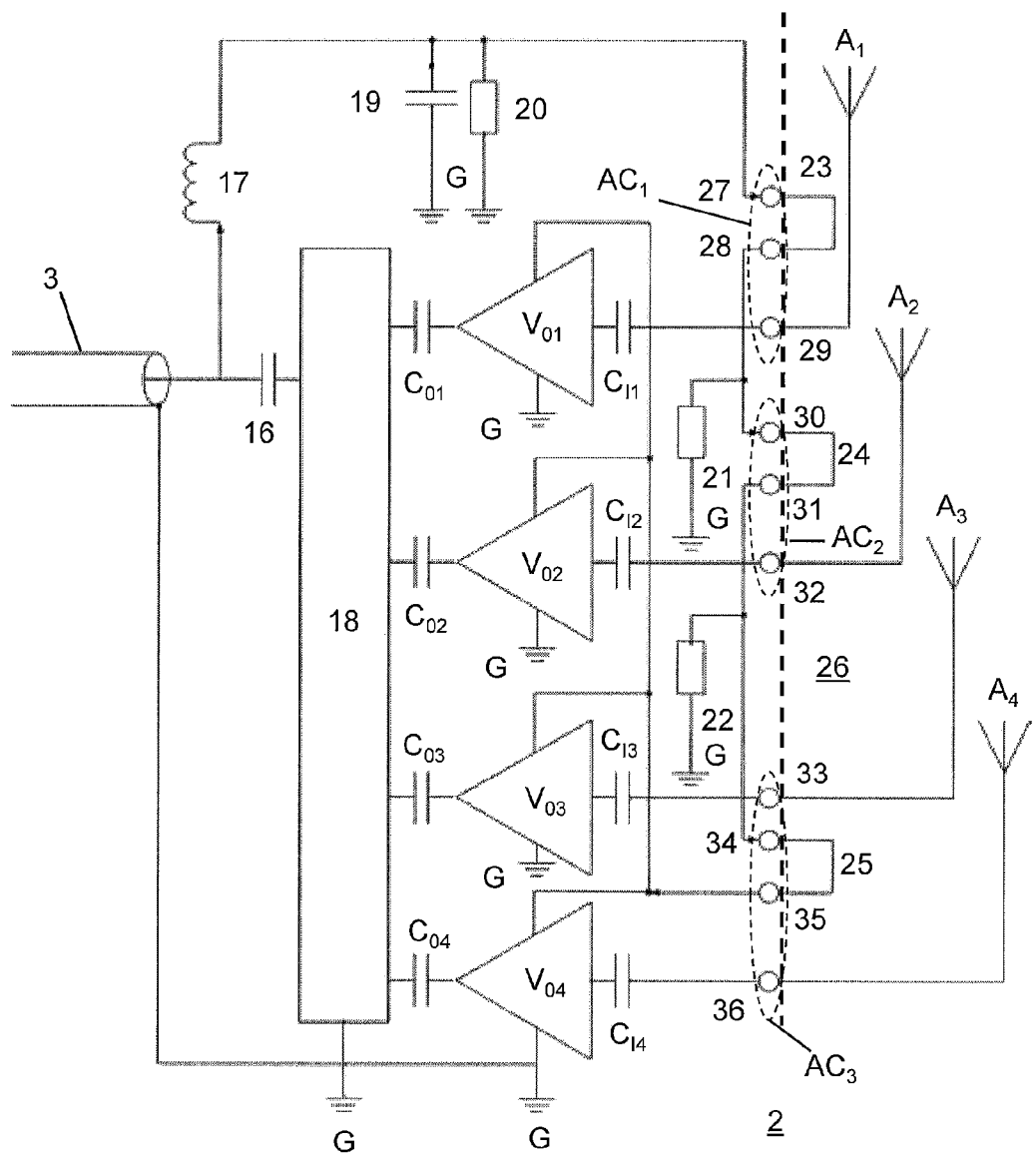
FIG. 4 is a block diagram illustrating an exemplary frontend portion applicable in the system of FIG. 1.
Figure 5:
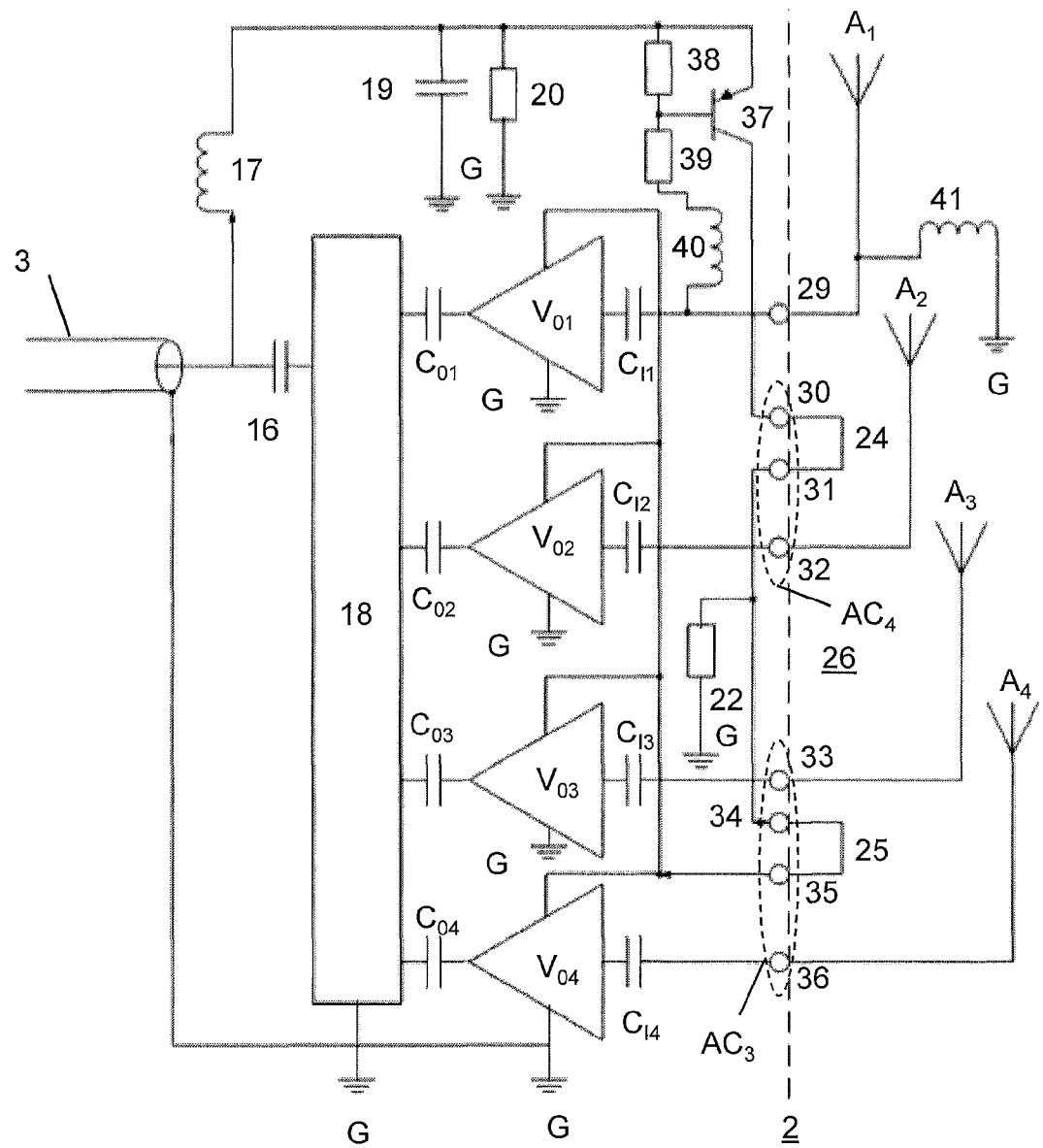
FIG. 5 is a block diagram illustrating another exemplary frontend portion applicable in the system of FIG. 1.
Figure 6:
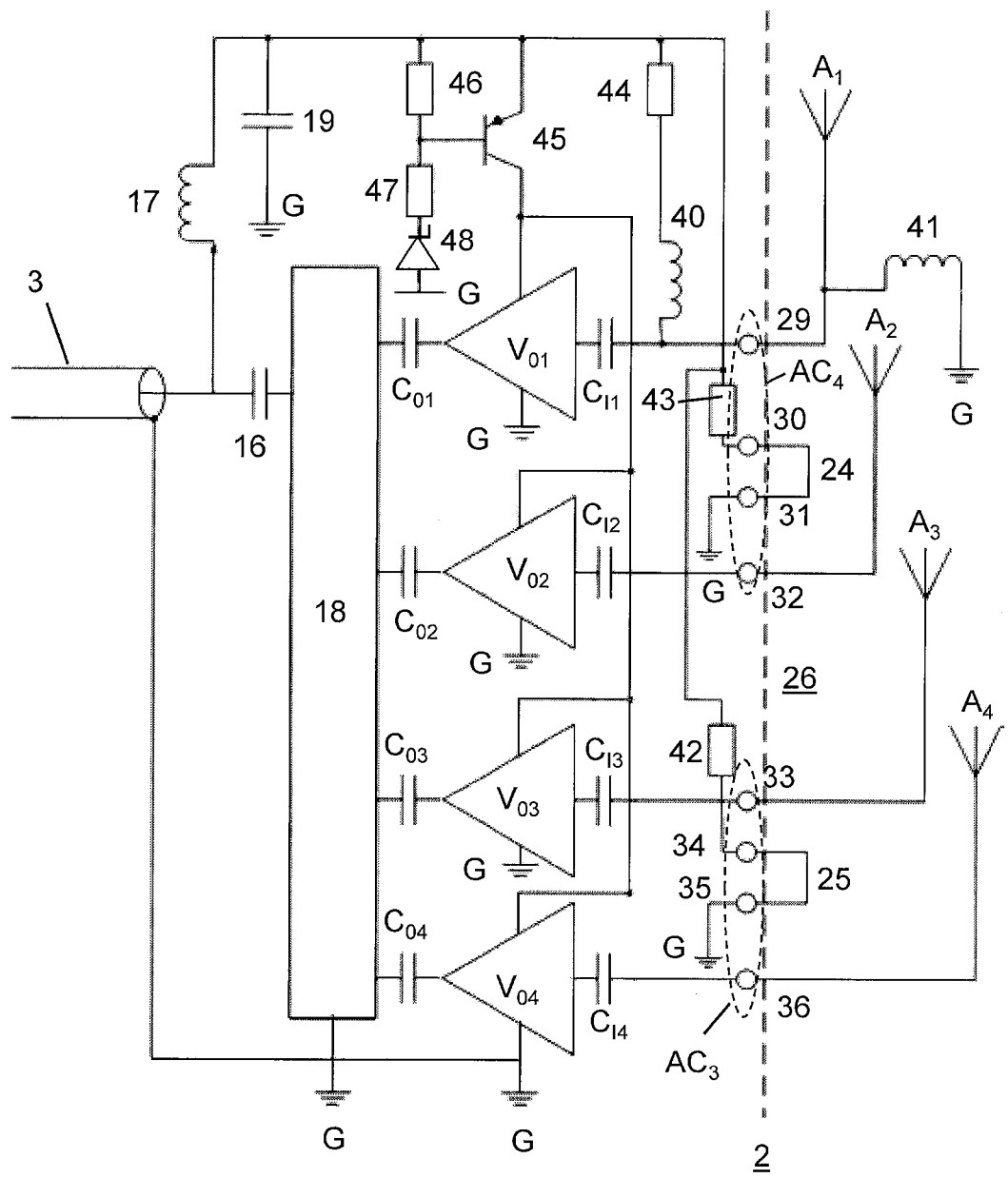
FIG. 6 is a block diagram illustrating still another exemplary frontend portion applicable in the system of FIG. 1.

In FIGS. 4-6, exemplary frontend portions 2 are shown which include N antennas $A_1, A_2 \ldots A_N$ (e.g., N=4), each antenna being optimized for a specific frequency band and antenna amplifiers $V_1, V_2 \ldots V_N$ that are, together with input capacitors $C_{I1} \ldots C_{IN}$ and output capacitors $C_{O1} \ldots C_{ON}$, each connected between one of the N (=4) antennas and a combiner network 18. The combiner network 18 may be a passive network and is connected to the feed line 3 through a capacitor 16 that forms together with an inductor 17, a capacitor 19, and a splitter network. The inductor 17 connects the feed line 3 to a first terminal of a capacitor 19 whose second terminal is connected to ground G. A resistor 20, which forms part of the internal resistance $R_i$, is connected in parallel to capacitor 19.

Referring now to FIG. 4, the front end portion 2, which may cooperate with the backend portion 1 as described above in connection with FIG. 2, further includes two resistors 21, 22, and three jumpers 23, 24, 25. The jumpers 23, 24, 25 are integrated in multi-plug antenna connectors $AC_1$, $AC_2$ and $AC_3$ that include at least one antenna plug 29, 32, and 33, 36 respectively and at least two jumper plugs 27 and 28; 30; 31; and 34-35 respectively. The antennas $A_1, A_2 \ldots A_N$ (N=4) are encapsulated (integrated) in a pane of glass like, for example, similarly configured conductor stripes that are integrated in a rear window 26 of an automobile. The jumpers 23, 24, 25 and the antennas $A_1, A_2 \ldots A_N$ are connected to the remaining circuitry of the frontend portion 2 by way of the plugs 27-36 which engage with corresponding jacks (not shown) in order to provide (detachable) electrical connections. Antenna plugs 29, 32, 33 and 36 (with corresponding jacks) serve to connect the N (=4) antennas $A_1, A_2 \ldots A_N$ to the antenna amplifiers $V_1$, $V_2 \ldots V_N$ via input capacitors $C_{I1} \ldots C_{IN}$. The antenna amplifiers $V_1, V_2 \ldots V_N$ are connected in parallel in terms of supply lines, i.e., the first supply lines of antenna amplifiers $V_1, V_2 \ldots V_N$ are connected to ground G and second supply lines are connected to jumper plug 35 of jumper 25 whose other jumper plug 34 is connected to jumper plug 31 of jumper 24 and through resistor 22 to ground G. Jumper plug 30 of jumper 24 is connected to jumper plug 28 of jumper 23 and through a resistor 21 to ground G. Jumper plug 27 of jumper 23 is connected to the first terminal of capacitor 19.

If any one of the multi-plug antenna connectors $AC_1$, $AC_2$ and $AC_3$ is pulled off, broken, or otherwise disconnected; the supply chain for all antenna amplifiers $V_1, V_2 \ldots V_N$ is interrupted and no power is consumed by the antenna amplifiers $V_1, V_2 \ldots V_N$. In this case, the internal resistance $R_i$ is determined by the resistance $R_{20}$ of resistor 20 and, depending on which one of the jumpers 23, 24, 25 is disconnected, also by the resistances $R_{21}, R_{22}$ of resistors 21 and 22, respectively. For instance, if jumper 23 which corresponds to antenna $A_1$ is disconnected, then $1/R_i=1/R_{20}$. If jumper 24 which corresponds to antenna $A_2$ is disconnected, then $1/R_i=1/R_{20}+1/R_{21}$. If jumper 25 which corresponds to antennas $A_3$ and $A_4$ is disconnected, then $1/R_i=1/R_{20}+1/R_{21}+1/R_{22}$. Assuming, as an example, that resistors 20, 21, 22 have the same resistances $R_{20}=R_{21}=R_{22}=R$, then:

$R_i=R$, when jumper 23 is disconnected, i.e., antenna $A_1$ is disconnected;

$R_i=R/2$, when jumper 24 is disconnected, i.e., antenna $A_2$ is disconnected;

$R_i=R/3$, when jumper 25 is disconnected, i.e., antennas $A_3$ and $A_4$ are disconnected.

The resistance of the antenna amplifiers $V_1, V_2 \ldots V_N$ may be, for instance, less than R/10. If none of the jumpers 23, 24, 25 and, thus, none of the antennas $A_1, A_2 \ldots A_N$ are disconnected the internal resistance $R_i<R/10$. The backend portion 1 (e.g., the one shown in FIG. 2) measures the internal resistance $R_i$ of the frontend portion 2 and determines by way of the measured internal resistance $R_i$ the status of the frontend portion 2.

Referring to FIG. 5, the front end portion 2, which may cooperate with the backend portions 1 as described above in connection with FIGS. 2 and 3, employs a controllable switch 37-39 and two inductors 40, 41 instead of the jumper 23 and the resistor 21 in the frontend portion 2 of FIG. 4. The antenna plugs 29, 32 and the jumper 24 including jumper plugs 30, 31 are integrated in a multi-plug antenna connector $AC_4$ and antenna connectors $AC_1$, $AC_2$ have been omitted. The controllable switch 37-39 includes a transistor, for example, a pnp bipolar transistor 37 which has base, collector and emitter terminals. The emitter and base terminals are connected to each other by way of a resistor 38, and the base terminal is further connected through a resistor 39 and the inductor 40 to the contact element 29. The inductor 41 couples contact element 29 with ground G in terms of DC and may be integrated in the rear window 26. As there is no jumper 23, corresponding contact elements 27 and 28 can be omitted.

The controllable switch 37-39 is switched on when the contact element 29 is in the operating condition, as in this case, the base terminal of transistor 37 is connected to ground G via the contact element 29, the resistor 39 and the inductors 40 and 41, otherwise it is switched off. The remaining circuit, in particular the jumpers 24 and 25 operate as described above in connection with FIG. 4.

FIG. 6 illustrates modifications in the front end portion 2 of FIG. 5. The front end portion 2 shown in FIG. 6 may cooperate with the backend portion 1 as described above in connection with FIG. 3. The rear window 26 and the antenna connectors $AC_3$, $AC_4$ are the same as in the example of FIG. 5, however, the external wiring of the jumper plugs 30, 31, 34, 35 is different. Jumper plugs 35 and 31 are connected to ground G and jumper plugs 34 and 30 are connected through a resistor 42 and 43 to the first terminal of capacitor 19. The series-connected resistors 38 and 39 in the frontend portion 2 of FIG. 5 are substituted by a single resistor 44. Resistor 20 and transistor 37 are omitted. The second supply lines of antenna amplifiers $V_1, V_2 \ldots V_N$ are connected to the collector terminal of a transistor 45 (e.g., pnp bipolar) whose emitter terminal is connected to the first terminal of capacitor 19. A resistor 46 is connected between the base terminal of transistor 45 and the first terminal of capacitor 19. Furthermore, a resistor 47 and a series connected reference voltage element (e.g., a Zener diode 48), are connected between the base terminal of transistor 45 and the ground G.

The transistor 45 in connection with the Zener diode 48 and the resistors 46, 47 form a voltage controlled switch 45-48 that is switched on when the voltage supplied to the frontend portion 2 is larger by a certain amount than a reference voltage provided by the Zener diode 48. Otherwise it is switched off. When combined with, for example, the backend portion 1 shown in FIG. 3, the frontend portion 2 may be switched into an operating mode or a test mode that depends on the voltage supplied to the frontend portion 2. In the present example, the test mode is active when a voltage sufficient lower than that provided in the operating mode is supplied by the backend portion 1.

In the backend portion 1 of FIG. 3, the test mode is established by a constant current supply from the current source 10 (i.e., the switch 15 is in a non-conducting state). This constant current when applied to the internal resistance $R_i$ produces a supply voltage that controls the controllable switch 45-48 such that it switches off. When the switch 15 is in a conducting state, the full voltage is supplied to the frontend portion 2 which turns the controllable switch into an on-state. Accordingly, in the test mode, all antenna amplifiers $V_i, V_2 \ldots V_N$ are switched off (i.e., inactive), and the internal resistance $R_i$ mainly depends on the resistors 42 and 44 and which one of the jumpers 24 and 25 is disconnected (i.e., if one is disconnected at all). The presence of jumper 24 indicates that antenna plug 29 and 32 are operable and the presence of jumper 25 indicates that antenna plugs 33 and 36 are operable. When the antenna plug 29 is operable, the resistor 44 is connected to ground G thereby decreasing the internal resistance $R_i$. With an adequate choice of resistance values for resistors 42-44, it is possible to determine which one of the antennas is not connected by measuring the internal resistance $R_i$. For instance, an adequate choice may be R, R/2 and R/4. Instead of jumpers, switches may be used and arranged to be in mechanical contact with, for example, integrated in the connectors, which may be integrated in the rear window.

It will be obvious to those reasonably skilled in the art that other components performing the same functions may be suitably substituted. Such modifications to the concept disclosed herein are intended to be covered by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An antenna system comprising a frontend portion, a backend portion and a feed line which connects the frontend portion and backend portion with each other, in which:
   the frontend portion comprises at least two antennas, a combiner connected downstream of the antennas and upstream of the feed line, and antenna connectors that electrically connect through antenna plugs the antennas to the combiner;
   the backend portion comprises an electrical power source connected to the feed line and a resistance evaluation circuit that is connected between the electrical power source and the feed line, the resistance evaluation circuit measures a resistance of the frontend portion through the feed line;
   at least one of the antenna connectors is in mechanical contact with a jumper including jumper plugs between which a higher resistance connection and a lower resistance connection is provided that depends on whether a corresponding antenna is connected to the combiner or not, the jumper plugs are connected to the feed line such that an internal resistance of the frontend portion depends on whether the corresponding antenna is connected to the combiner or not; and
   the resistance evaluation circuit is further configured to detect whether one of the antennas is not connected to a corresponding antenna amplifier by evaluating the resistance of the frontend portion.

2. The antenna system of claim 1, in which at least one of the connectors is partly or totally removable.

3. The antenna system of claim 2, in which at least one antenna connector comprises the jumper that is integrated in the at least one of the antenna connectors so that the jumper is removed when the at least one of the antenna connectors is removed.

4. The antenna system of claim 1, in which resistors are connected in series or in parallel to at least one jumper.

5. The antenna system of claim 4, in which at least two resistors are connected in series or in parallel when the at least one jumper is in place.

6. The antenna system of claim 4, in which at least one of the antennas or the at least one jumper is integrated in a pane of glass.

7. The antenna system of claim 4, in which the at least one jumper is electrically connected such that, if one of the at least jumper is removed, a plurality of antenna amplifiers become inactive.

8. The antenna system of claim 4, in which the backend portion comprises the electrical power source, a constant voltage source, and a current measuring circuit for evaluating the internal resistance of the frontend portion.

9. The antenna system of claim 4, in which at least one of the resistors contributing to the internal resistance of the frontend portion is connected via a first inductor, a second inductor, and one of the connectors to the feed line.

10. The antenna system of claim 1, further comprising a controllable switch electrically coupled to the frontend portion that is controlled by a voltage across or a current from the backend portion.

11. The antenna system of claim 1, in which the backend portion provides a first voltage and a second voltage to the frontend portion in an operating mode and in a test mode, respectively.

12. The antenna system of claim 11, in which the backend portion provides a constant voltage in the operating mode and a constant current in the test mode.

13. The antenna system of claim 11, in which the frontend portion includes a controllable switch that deactivates a plurality of antenna amplifiers when the backend portion is in a test mode.

14. An antenna system comprising:
   a frontend portion including a plurality of antennas, a combiner connected downstream of the plurality of antennas and upstream of a feed line, and a plurality of antenna connectors that electrically connect through antenna plugs the plurality of antennas to the combiner;
   a backend portion including an electrical power source connected to the feed line and a resistance evaluation circuit that is connected between the electrical power source and the feed line, wherein the backend portion is electrically connected to the frontend portion via the feed line and wherein the resistance evaluation circuit is configured to measure a resistance of the frontend portion through the feed line; and
   at least one of the antenna connectors of the plurality of antenna connectors is in mechanical contact with a jumper of a plurality of jumpers, the jumper including jumper plugs between which a higher resistance connection and a lower resistance connection is provided that depends on whether a corresponding antenna of the plurality of antennas is connected to the combiner or not, the jumper plugs are connected to the feed line such that an internal resistance of the frontend portion depends on whether the corresponding antenna is connected to the combiner or not, wherein the resistance evaluation circuit is further configured to detect whether one of the plurality of antennas is not connected to a corresponding antenna amplifier by evaluating the resistance of the frontend portion.

15. The antenna system of claim 14 further comprising a plurality of resistors that are connected in series or in parallel when at least one jumper of the plurality of jumpers is in place.

16. The antenna system of claim 15, in at least one antenna of the plurality of antennas or the at least one jumper is integrated in a pane of glass.

17. The antenna system of claim 15, in which the plurality of jumpers are electrically connected such that, if one of the jumpers is removed, the antenna amplifiers become inactive.

18. The antenna system of claim 15, wherein the backend portion comprises the electrical power source, a constant voltage source, and a current measuring circuit for evaluating the internal resistance of the frontend portion.

19. The antenna system of claim 15, in which at least one resistor of the plurality of resistors contributes to the internal resistance of the frontend portion and is connected via a first inductor, a second inductor, and one of the connectors to the feed line.

20. An antenna system comprising:
a frontend portion including:
   a plurality of antennas;
   a combiner connected downstream of the plurality of antennas and upstream of a feed line; and
   a plurality of antenna connectors that electrically connect the plurality of antennas to the combiner;
a backend portion including an electrical power source connected to the feed line and a resistance evaluation circuit that is connected between the electrical power source and the feed line, wherein the backend portion is electrically connected to the frontend portion via the feed line and wherein the resistance evaluation circuit is configured to measure a resistance of the frontend portion through the feed line; and
at least one of the antenna connectors of the plurality of antenna connectors is in mechanical contact with a jumper of a plurality of jumpers, the jumper including jumper plugs between which a higher resistance connection and a lower resistance connection is provided that depends on whether a corresponding antenna of the plurality of antennas is connected to the combiner or not, the jumper plugs are connected to the feed line such that an internal resistance of the frontend portion depends on whether the corresponding antenna is connected to the combiner or not, wherein the resistance evaluation circuit is further configured to detect whether one of the plurality of antennas is not connected to a corresponding antenna amplifier by evaluating the resistance of the frontend portion.

* * * * *